United States Patent
Chung

(10) Patent No.: US 7,492,051 B1
(45) Date of Patent: Feb. 17, 2009

(54) ENERGY-SAVING GENERATOR SET

(76) Inventor: Yuang-Cheng Chung, No.73, Sec. 2, Fulin Rd., Cyonglin Township, Hsinchu County 307 (TW)

( * ) Notice: Subject to any disclaimer, the term of this patent is extended or adjusted under 35 U.S.C. 154(b) by 0 days.

(21) Appl. No.: 12/081,465

(22) Filed: Apr. 16, 2008

(51) Int. Cl.
*F02B 63/04* (2006.01)
*H02K 7/18* (2006.01)

(52) U.S. Cl. .................. 290/1 A; 290/1 B; 290/4 C; 290/4 R; 290/1 C; 290/16

(58) Field of Classification Search .............. 290/1 A, 290/1 B, 1 C, 4 C, 16
See application file for complete search history.

(56) References Cited

U.S. PATENT DOCUMENTS 6,362,533 B1 * 3/2002 Morohoshi et al. .......... 290/1 A
7,268,442 B2 * 9/2007 Syed et al. ................ 290/40 C
7,398,747 B2 * 7/2008 Onodera et al. ........... 123/41.65

* cited by examiner

*Primary Examiner*—Darren Schuberg
*Assistant Examiner*—Iraj A Mohandesi
(74) *Attorney, Agent, or Firm*—Birch, Stewart, Kolasch & Birch, LLP

(57) ABSTRACT

An energy-saving generator set includes a generator having a battery provided therein for starting the generator; a mechanical energy generating mechanism provided inside the generator to generate high-voltage power supply via a split magnetic coil thereof; a distribution board provided on the generator for dividing the generated high-voltage power supply into three parts, which are separately supplied to the mechanical energy generating mechanism, the battery, and an external electrical appliance via an output interface on the generator; and a control switch for controlling the starting of the mechanical energy generating mechanism and the leading of the generated high-voltage power supply to the output interface when the battery has been fully charged.

8 Claims, 2 Drawing Sheets

ENERGY-SAVING GENERATOR SET

FIELD OF THE INVENTION

The present invention relates to a power generator, and more particularly to an energy-saving generator set.

BACKGROUND OF THE INVENTION

With the growing consciousness of environmental protection, most technologically developed countries have devoted to the exploitation of usable clean energy resources. Solar energy, fuel battery, and wind power generation may be applied in a manner different from the past electricity generation based on concentrated energy production, and are deemed as new energy resources for distributive electricity generation. Moreover, in view of the constantly raised oil prices, it has become a global target to develop green energy resources. A conventional gas-fueled micro-turbo generator would cost about US $77,000.00, which is almost the same as the cost for a general diesel generator or a gas-fired generator, and operates by directly bringing a rotary shaft to rotate and thereby generates electricity. While this type of generator set provides only limited benefits and usable life, it requires a large quantity of labor force and resources to maintain the operation thereof, and is therefore extremely costly and not suitable for use in an energy-saving era.

Generally, a conventional heat power generator may have a scale determined according to the estimated heat energy needed by consumers. Any surplus electricity is input and stored in electricity supply facilities. However, the stored electricity tends to lose when the electricity storage facilities have become old.

It is therefore tried by the inventor to develop an energy-saving generator set to overcome the problems existed in the conventional generators.

SUMMARY OF THE INVENTION

A primary object of the present invention is to provide an energy-saving generator set that utilizes natural resources to cyclically generate high-voltage power supply for use by the generator itself and external electric appliances to achieve the purpose of energy saving and environmental protection.

Another object of the present invention is to provide an energy-saving generator set that employs the principle of magnetic floating force to amplify the generated electricity and accordingly generates a relatively large high-voltage power supply for external use to achieve the purpose of electricity supply.

To achieve the above and other objects, the energy-saving generator set according to the present invention includes a generator having a battery provided therein for starting the generator; a mechanical energy generating mechanism provided inside the generator to generate high-voltage power supply via a split magnetic coil thereof; a distribution board provided on the generator for dividing the generated high-voltage power supply into three parts, which are separately supplied to the mechanical energy generating mechanism for generating power, the battery for charging the same, and an external electrical appliance via an output interface on the generator; and a control switch for controlling the starting of the mechanical energy generating mechanism and the leading of the generated high-voltage power supply to the output interface when the battery has been fully charged.

With the above arrangements, the generator set of the present invention has simple structure to enable the utilization of clean natural resources to stably and cyclically generate high-voltage power supply.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
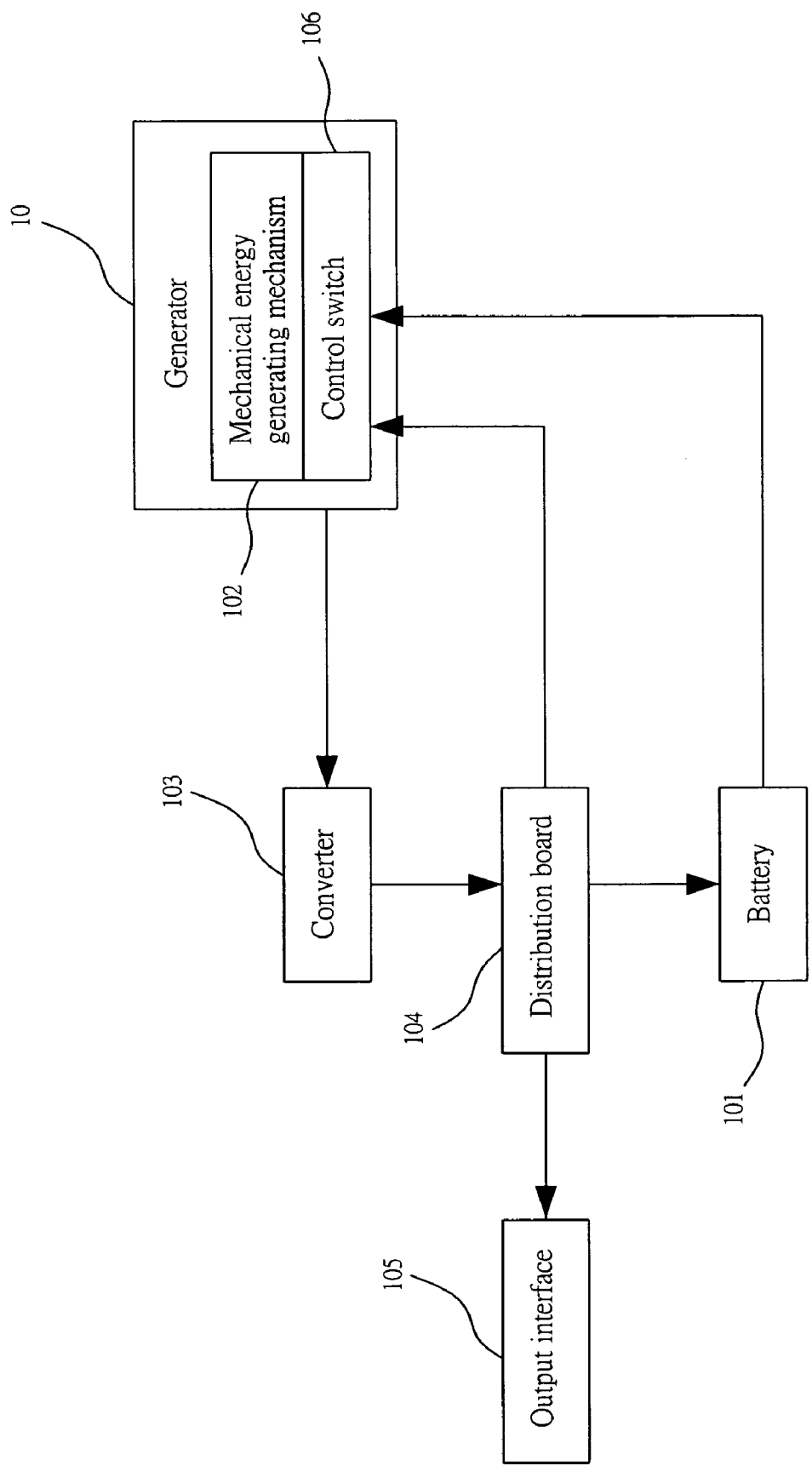
FIG. 1 is a block diagram of an energy-saving generator set according to a preferred embodiment of the present invention.
Figure 2:
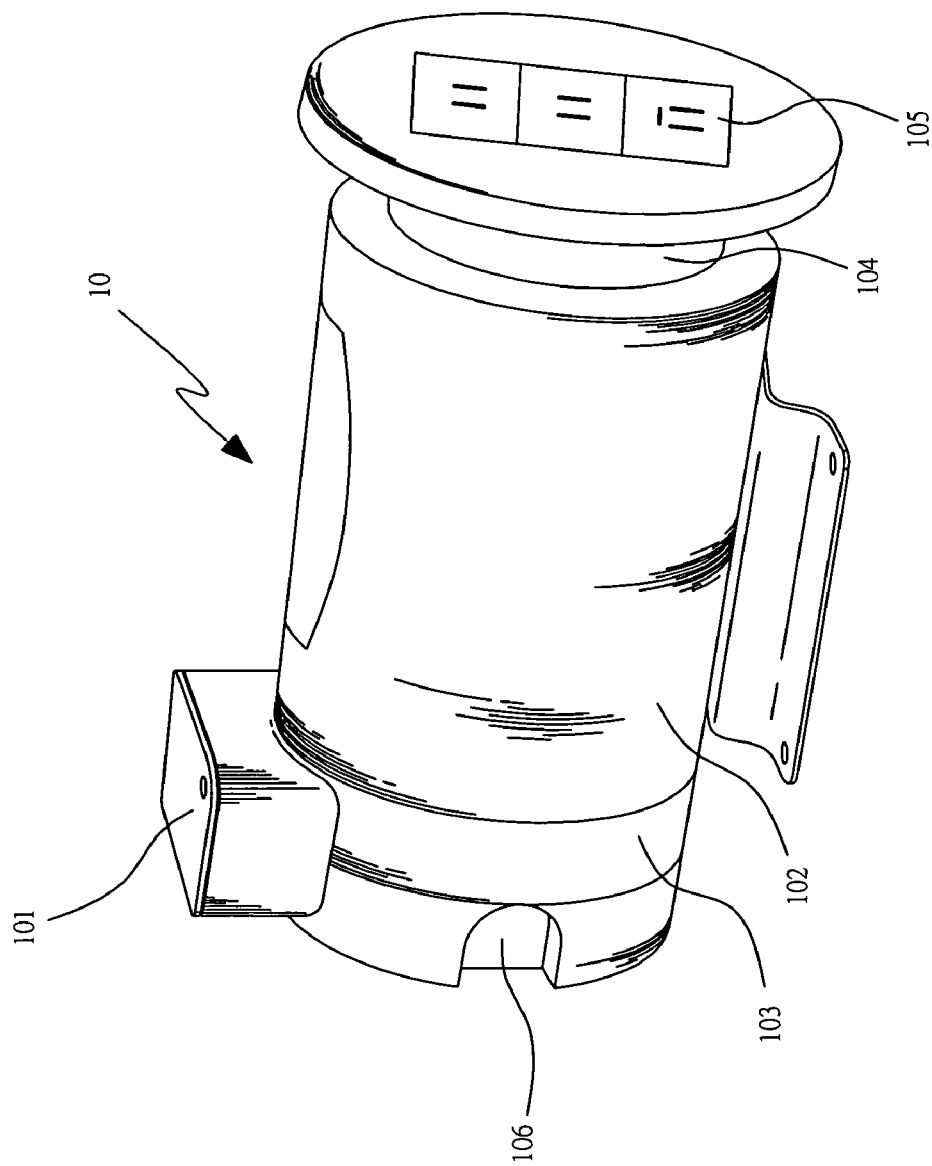
FIG. 2 is a perspective view of an energy-saving generator set according to the preferred embodiment of the present invention.

Please refer to FIGS. 1 and 2 that are block diagram and perspective view, respectively, of an energy-saving generator set according to a preferred embodiment of the present invention. As shown, the energy-saving generator set of the present invention includes a generator 10 having a battery 101 provided therein for starting the generator 10. The generator 10 has a mechanical energy generating mechanism 102 provided therein. Through the operation of a split magnetic coil in the mechanical energy generating mechanism 102, a high-voltage power supply may be generated. The generated high-voltage power supply is converted by a converter 103 into direct current (DC), and the obtained DC is transferred to a distribution board 104. At the distribution board 104, the high-voltage power supply is divided into three parts, of which a first part is transferred to the mechanical energy generating mechanism 102 for the same to continuously generating high-voltage power supply, a second part is used to charge the battery 101, and a third part is led to an output interface 105 for supplying to an external electrical appliance. When the battery 101 is fully charged, the second part high-voltage power supply is also led to the output interface 105 under control of a control switch 106. In this manner, the generator 10 is able to cyclically generate high-voltage power supply. With the principle of magnetic floating force employed by the split magnetic coil, the operation of generating high-voltage power supply by the mechanical energy generating mechanism 102 may be amplified. Since the high-voltage power supply generated by the mechanical energy generating mechanism 102 is far beyond the energy required to start the operation of the generator 10, the high-voltage power supply generated by the generator 10 is not subject to the risk of depletion.

The battery 101 may be a lead battery, a lithium battery, a fuel battery, or other suitable types of batteries. The mechanical energy generating mechanism 102 may utilize a variety of natural resources, such as wind force, solar energy, temperature difference, and tidal flow, to achieve the operation thereof to enable saving of a lot of electric energy. The generator 10 of the present invention is not limited to any specific size but may be expanded in size according to actual need. For example, the generator 10 may have a size large enough for use in plants and city-level public utility systems, or as small as 10 to 20 centimeters for use by an individual user.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An energy-saving generator set, comprising:
   a generator having a battery provided therein for starting the generator;
   a mechanical energy generating mechanism provided inside the generator to generate a high-voltage power supply via a split magnetic coil;
   a distribution board provided in the generator to divide the high-voltage power supply generated by the mechanical energy generating mechanism into three parts, so that a first part of the generated high-voltage power supply is fed back to the mechanical energy generating mechanism for the same to continuously generate the high-voltage power supply, a second part of the generated high-voltage power supply is used to charge the battery, and a third part of the generated high-voltage power supply is transferred to an output interface for supplying to an external electric appliance; and
   a control switch for controlling the starting of the mechanical energy generating mechanism and leading the generated high-voltage power supply to the output interface when the battery has been fully charged.

2. The energy-saving generator set as claimed in claim 1, wherein the split magnetic coil employs the principle of magnetic floating force to enable the operation of the mechanical energy generating mechanism for generating the high-voltage power supply.

3. The energy-saving generator set as claimed in claim 1, wherein the battery is selected from the group consisting of a lead battery, a lithium battery, and a fuel battery.

4. The energy-saving generator set as claimed in claim 1, wherein the generator further includes a converter for converting the high-voltage power supply generated by the mechanism energy generating mechanism into direct current, and the direct current is then transferred to the distribution board.

5. The energy-saving generator set as claimed in claim 1, wherein the mechanical energy generating mechanism utilizes wind force to achieve the operation thereof.

6. The energy-saving generator set as claimed in claim 1, wherein the mechanical energy generating mechanism utilizes solar energy to achieve the operation thereof.

7. The energy-saving generator set as claimed in claim 1, wherein the mechanical energy generating mechanism utilizes temperature difference to achieve the operation thereof.

8. The energy-saving generator set as claimed in claim 1, wherein the mechanical energy generating mechanism utilizes tidal flow to achieve the operation thereof.

\* \* \* \* \*